United States Patent
Winkles et al.

(10) Patent No.: US 7,292,593 B1
(45) Date of Patent: Nov. 6, 2007

(54) ARRANGEMENT IN A CHANNEL ADAPTER FOR SEGREGATING TRANSMIT PACKET DATA IN TRANSMIT BUFFERS BASED ON RESPECTIVE VIRTUAL LANES

(75) Inventors: Joseph Winkles, Austin, TX (US); Joseph A. Bailey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1071 days.

(21) Appl. No.: 10/107,151

(22) Filed: Mar. 28, 2002

(51) Int. Cl.
  *H04L 12/28* (2006.01)
  *H04L 12/56* (2006.01)
  *H04J 3/16* (2006.01)
(52) U.S. Cl. .................. 370/412; 370/428; 370/469
(58) Field of Classification Search .............. None
  See application file for complete search history.

(56) References Cited

U.S. PATENT DOCUMENTS

| | | | |
|---|---|---|---|
| 6,870,854 B1 * | 3/2005 | Aimoto et al. | 370/412 |
| 7,209,489 B1 * | 4/2007 | Bailey et al. | 370/412 |
| 2002/0091844 A1 * | 7/2002 | Craft et al. | 709/230 |
| 2002/0150106 A1 * | 10/2002 | Kagan et al. | 370/395.6 |
| 2002/0172195 A1 * | 11/2002 | Pekkala et al. | 370/360 |
| 2002/0176430 A1 * | 11/2002 | Sangha et al. | 370/412 |
| 2003/0016689 A1 * | 1/2003 | Hoof | 370/428 |
| 2004/0202192 A9 * | 10/2004 | Galbi et al. | 370/412 |
| 2005/0207423 A1 * | 9/2005 | Herbst | 370/395.7 |

OTHER PUBLICATIONS

Cassiday et al., "Hot Chips", *InfiniBand™ Architecture Tutorial*, Aug. 2000, pp. 1-79, InfiniBand™ Trade Association.
Hartmann, "Using The VIEO InfiniBand™ Channel Abstraction Layer (CAL)", *Channel Abstraction Layer (CAL)*, Jan. 2002, pp. 1-19, VIEO, Inc.

* cited by examiner

*Primary Examiner*—Wing Chan
*Assistant Examiner*—Gregory B. Sefcheck
(74) *Attorney, Agent, or Firm*—Manelli Denison & Selter PLLC; Leon R. Turkevich (57) ABSTRACT

A host channel adapter includes a transport layer module, a link layer module, and buffer memory having memory portions configured for storage of transmit data packets output by the transport layer module for transmission by the link layer module on identified virtual lanes. The transport layer module is configured for identifying a virtual lane for each transmit data packet, and for storing the transmit data packet in the corresponding memory portion assigned to the corresponding identified virtual lane. Hence, the transmit data packets output by the transport layer module are stored in the memory portions based on their respective identified virtual lanes, where each memory portion stores the transmit data packets for the corresponding identified virtual lane. The link layer module retrieves the transmit data packets from a selected memory portion corresponding to a currently-serviced virtual lane based on a prescribed virtual lane arbitration. Hence, the link layer module can retrieve the transmit data packets for the currently-serviced virtual lane with minimal processing, based on accessing the corresponding memory portion.

10 Claims, 5 Drawing Sheets

ARRANGEMENT IN A CHANNEL ADAPTER FOR SEGREGATING TRANSMIT PACKET DATA IN TRANSMIT BUFFERS BASED ON RESPECTIVE VIRTUAL LANES

BACKGROUND OF THE INVENTION

1. Field of the Invention

The present invention relates to a host channel adapter configured for communication with target channel adapters in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, arbitrary hardware implementations may result in substantially costly or relatively inefficient hardware designs. The InfiniBand™ Architecture Specification requires that a packet sent via an HCA undergoes transport layer service, followed by link layer service, based on creation of a work queue entry in system memory by an executable verbs consumer resource. Examples of operations performed during transport layer service (performed, for example, by a transport layer module) include constructing a transport layer header, generating a packet sequence number, validating service type, etc., based on detecting a work notification of the work queue entry created in the system memory. Examples of operations performed during link layer service (performed, for example, by a link layer module) include service layer and virtual lane mapping (SL-VL mapping), link layer flow control packet generation, link layer transmission credit checking, etc.

Typically the transport layer module would service work queue entries by sequential processing of the respective work notifications, using a first in first out arrangement. However, the link layer operations within the HCA are configured for transmitting InfiniBand™ packets according to virtual lane prioritization. Hence, instances may arise where the transport layer module may service work notifications for work queue entries associated with a virtual lane having a relatively low priority.

Consequently, transport layer resources and link layer resources within the channel adapter are not coordinated relative to the link layer prioritization, resulting in inefficient utilization of resources. In particular, if the transport layer module stores transmit packets in a first-in first-out (FIFO) memory for subsequent processing by the link layer module, then the link layer module would need to retrieve the transmit packets according to their assigned virtual lane, requiring the link layer module to parse each transmit packet in the FIFO memory, and determine the corresponding assigned virtual lane to determine if the assigned virtual lane matched the current virtual lane being serviced by the link layer. The link layer module would need to repeat the FIFO memory search for each new packet, and each time the link layer module began servicing another virtual lane. Hence, the resource-intensive process of searching through the FIFO memory for transmit packets having matching assigned virtual lanes can substantially increase the complexity of the link layer module, increasing difficulties in the ability to guarantee that a quality of service level can be maintained.

SUMMARY OF THE INVENTION

There is a need for an arrangement that enables a host channel adapter to be implemented in an efficient and economical manner.

There also is a need for an arrangement that enables a host channel adapter to guarantee preferred Quality of Service policies for packet data flows output with minimal complexity.

These and other needs are attained by the present invention, where a host channel adapter includes a transport layer module, a link layer module, and buffer memory having memory portions configured for storage of transmit data packets output by the transport layer module for transmission by the link layer module on identified virtual lanes. The transport layer module is configured for identifying a virtual lane for each transmit data packet, and for storing the transmit data packet in the corresponding memory portion assigned to the corresponding identified virtual lane. Hence, the transmit data packets output by the transport layer module are stored in the memory portions based on their respective identified virtual lanes, where each memory portion stores the transmit data packets for the corresponding identified virtual lane. The link layer module retrieves the transmit data packets from a selected memory portion corresponding to a currently-serviced virtual lane based on a prescribed virtual lane arbitration. Hence, the link layer module can retrieve the transmit data packets for the currently-serviced virtual lane with minimal processing, based on accessing the corresponding memory portion.

One aspect of the present invention provides a method in a host channel adapter. The method includes determining by a transport layer module an assigned virtual lane for a transmit data packet, and storing, by the transport layer module, the transmit data packet into a selected memory portion associated with the assigned virtual lane of a buffer memory, the buffer memory having multiple memory portions for storing transmit data packets according to respective assigned virtual lanes. The method also includes identifying by a link layer module a currently-serviced virtual lane based on a prescribed virtual lane arbitration, and fetching, by the link layer module, stored transmit data packets from an identified one of the memory portions based on the corresponding currently-serviced virtual lane.

Another aspect of the present invention provides a host channel adapter. The host channel adapter includes a buffer memory having memory portions for storage of transmit data packets assigned for transmission on respective virtual lanes, a transport layer module, and a link layer module. The transport layer module is configured for determining a virtual lane for each transmit data packet, the transport layer module configured for storing each transmit data packet into a corresponding selected memory portion based on the corresponding determined virtual lane. The link layer module is configured for identifying a currently-serviced virtual lane based on a prescribed virtual lane arbitration, the link layer module configured for fetching the stored transmit data packets from an identified one of the memory portions based on the corresponding currently-serviced virtual lane.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
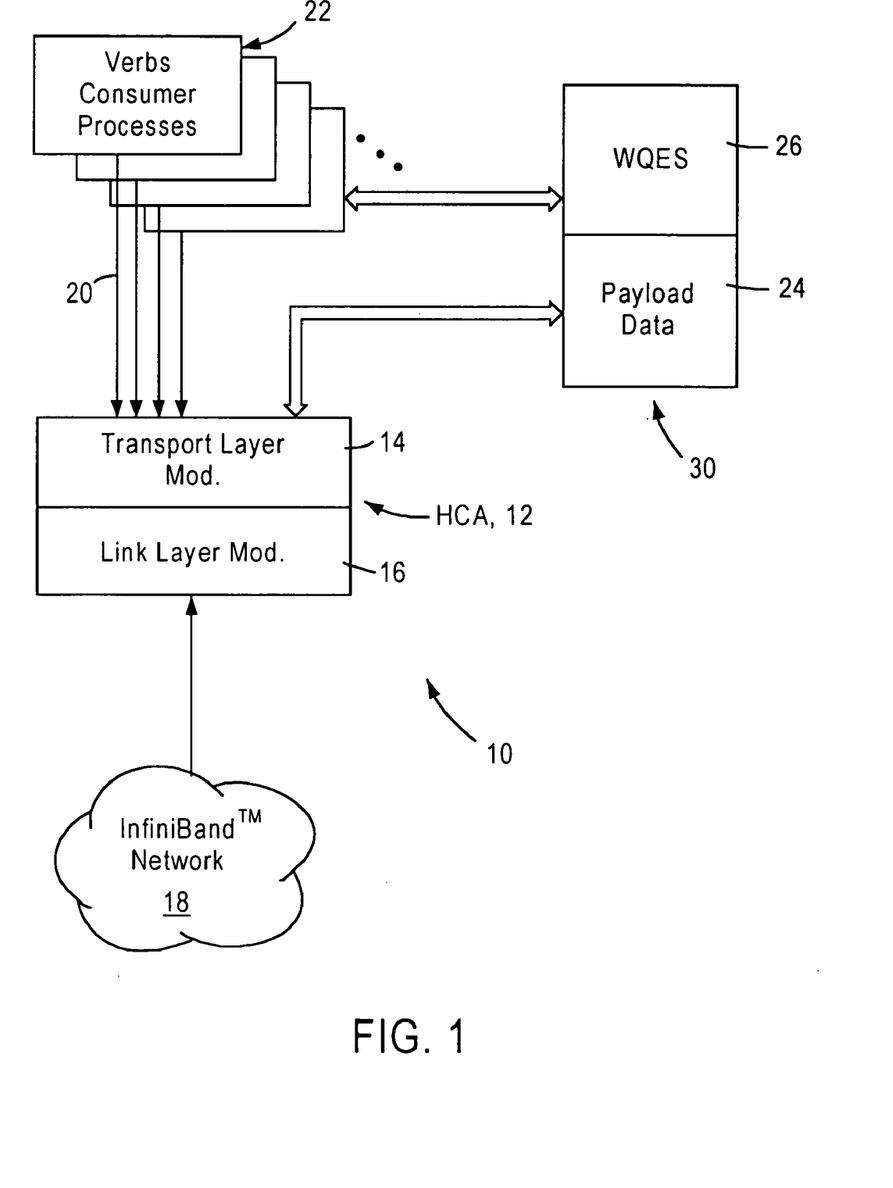
FIG. 1 is a diagram illustrating a host channel adapter configured for generating and outputting transmit data packets according to an embodiment of the present invention.

FIG. 1 is a block diagram illustrating a system 10 having a host channel adapter (HCA) 12 configured for generating and transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including link layer flow control packet generation, link layer transmission credit checking, and other operations. Although this conventional type of implementation has the advantage of precisely following the network layers specified in the InfiniBand™ Architecture Specification, such an arrangement can result in uncoordinated operations between the transport layer and the link layer. Hence, there is a concern with unnecessarily wasting transport layer resources on low priority operations.

According to the disclosed embodiment, the HCA 12 includes a transport layer module 14 and a link layer module 16. The transport layer operations executed by the transport layer 14 can be executed independent of the order of servicing virtual lanes by the link layer module 16, based on storage of the transmit data packets into memory portions of a buffer memory for respective virtual lanes. In particular, the link layer module 16 is configured for selecting one of the virtual lanes for transfer of data via the InfiniBand™ network 18. The link layer module 16 selects a virtual lane for data transfer (e.g., outputting transmit data or receiving receive data) according to a prescribed ordering sequence, for example weighted round robin queuing, described below, where each virtual lane has an identifiable ordering position within the ordering sequence utilized by the link layer module 16.

The transport layer module 14 is configured for receiving work notification requests 20 from different verbs consumer resources 22. Each verbs consumer resource 22, in response to receiving a request for service that requires access to a resource via the InfiniBand™ network 18, generates and stores in a system memory 30 a data message 24 to be transferred by the InfiniBand™ network 18, and a work queue entry (WQE) 26. The WQE 26 specifies the corresponding data message 24, and also selectively specifies a service level based on the service type to be used. In particular, the InfiniBand™ Architecture Specification defines a service level (SL) attribute that permits a packet traversing the InfiniBand™ network to operate at one of sixteen available service levels.

The InfiniBand™ Architecture Specification defines five service types that can be used: Unreliable Datagram, Reliable Datagram, Unreliable Connection, Reliable Connection, and Raw Datagram. In the cases of the Reliable Datagram, the Unreliable Connection, and the Reliable Connection service types, the HCA 12 contains the Service Level of all WQEs posted to the respective send queues. However in the case of the Unreliable Datagram service type, the service level is contained in each WQE supplied to the HCA 12.

As described below, the transport layer module 14 maintains a service level/virtual lane mapping table that maps a service level specified by the verbs consumer 22 to a prescribed virtual lane maintained by the link layer module 16.

The virtual lane arbitration used by the link layer module 16 for identifying the virtual lane to be serviced (i.e., the "currently-serviced virtual lane") may be a priority-based ordering sequence, where each ordering position is established by a priority-based arbitration.

Figure 2:
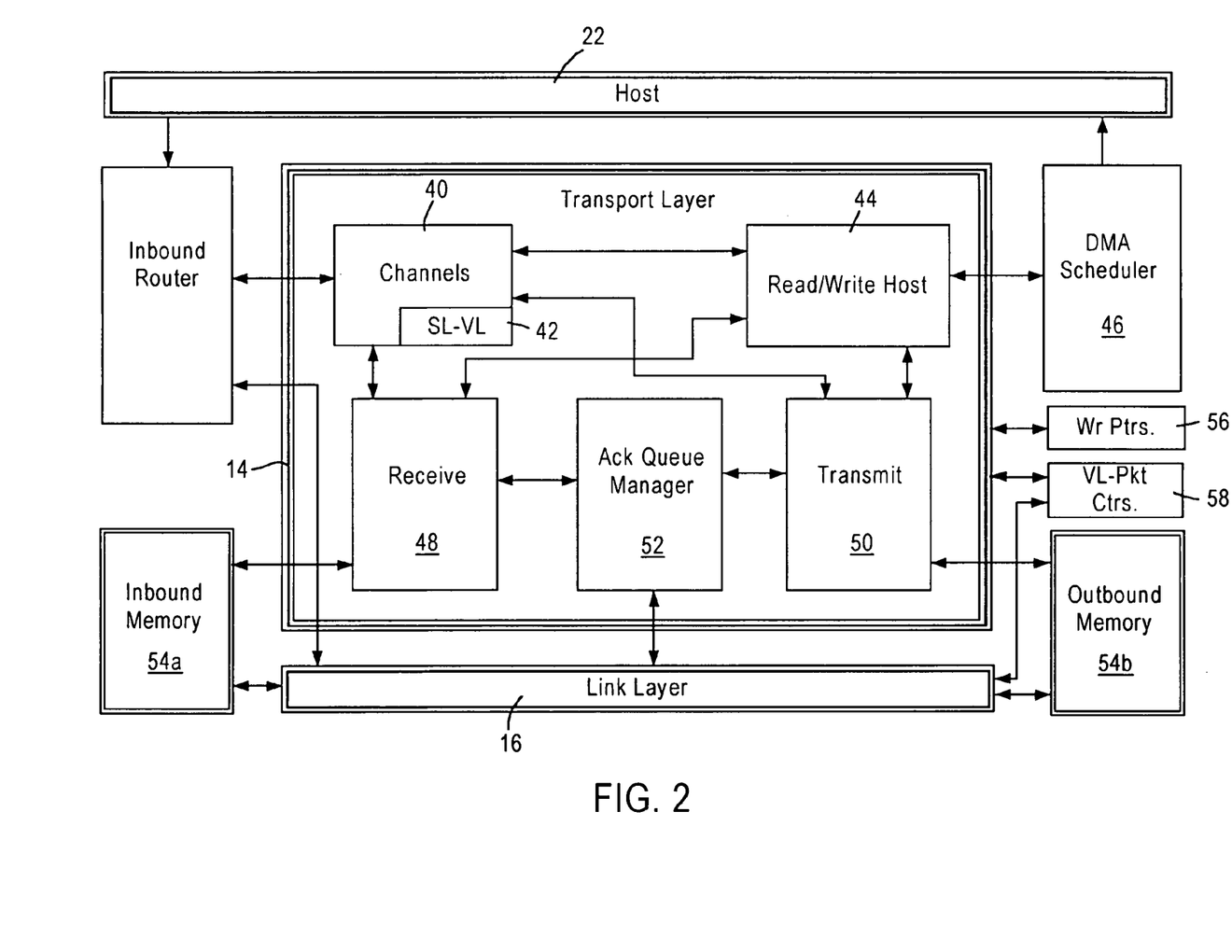
FIG. 2 is a diagram illustrating in detail the transport layer module of FIG. 1.

FIG. 2 is a block diagram illustrating in further detail the transport layer module 14 according to an embodiment of the present invention. The transport layer module 14 is configured for retrieving the WQEs 26 in response to the corresponding work notification requests 20 for construction of transport layer headers.

As shown in FIG. 2, the transport layer module 14 includes a channel module 40 having a service level to virtual lane mapping table 42, a read/write host manager 44 configured for managing read/write operations to and from the system memory 30 via a DMA scheduler 46, a receive service module 48, a transmit service module 50, and an acknowledgment queue manager 52. The HCA 12 also has local access to memory buffers 54a and 54b for storing receive data and transmit data, respectively.

The channels manager 40 is configured for managing transport services, including setup, management, and teardown of queue pairs. In particular, the channels manager is responsible for setup and teardown of transport connections: the communication management agent communicates with a subnet manager to establish the transport connections for the HCA 12.

The receive service module 48 is configured for determining whether a receive message includes application based data for a verbs consumer 22, transport service information for the channel manager 40, or an acknowledgment for the acknowledgment queue manager 52.

The transmit service module 50 is configured for generating the appropriate transport layer headers for the retrieved WQEs 26 based on the associated queue pair attributes. The transmit service module 50 also manages transmission of acknowledgments according to connection based requirements (e.g., reliable connection, reliable datagram) specified by the acknowledgment queue manager 52.

The transmit service module 50 also is configured for writing the transmit data packet into a selected memory region of the outbound memory buffer 54b, based on the determined assigned virtual lane for a transmit data packet. In particular, the HCA 12 includes write pointers 56 and virtual lane packet counters 58 that are accessed by the transmit service module 50 during writing of a transmit data packet into a selected memory region. As illustrated with respect to FIGS. 4 and 5, the transmit service module is configured for determining the assigned virtual lane for a transmit data packet, writing the transmit data packet into the selected memory portion 74 associated with the corresponding virtual lane based on the corresponding write pointer value 56, and incrementing the corresponding virtual lane packet counter 58 that specifies the number of transmit data packets stored in the corresponding memory portion 74 for the corresponding virtual lane.

Hence, the storage of transmit data packets in memory portions based on virtual lane enables the link layer module 16 to fetch the stored transmit data packets for a currently-serviced virtual lane merely by accessing the corresponding memory portion.

Figure 3:
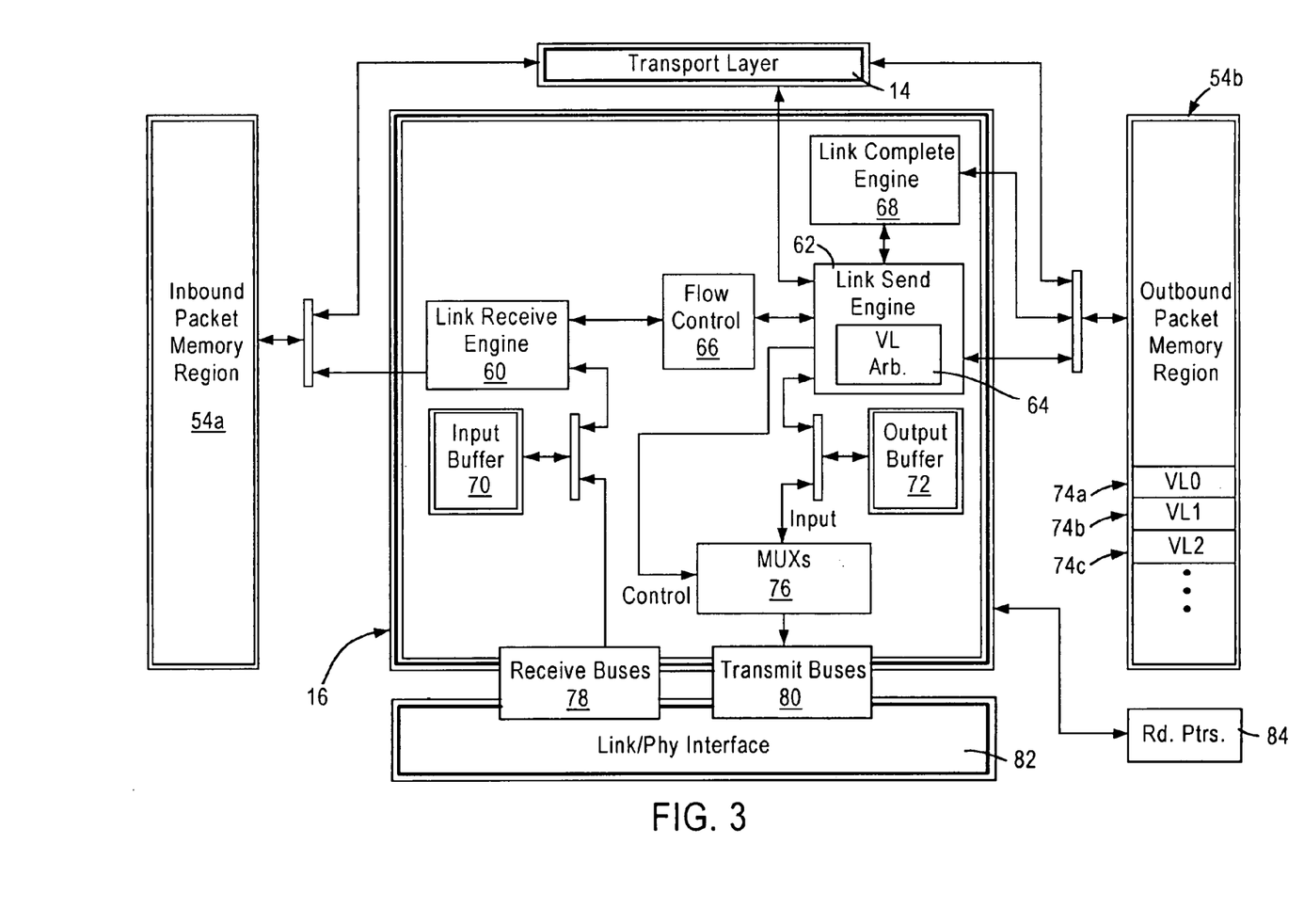
FIG. 3 is a diagram illustrating in detail the link layer module of FIG. 1.

FIG. 3 is a diagram illustrating in further detail the link layer module 16 according to an embodiment of the present invention. The link layer module 16 includes a link receive engine 60, a link send engine 62 having a virtual lane arbitration module 64, a flow control engine 66, and a link complete engine 68. The link layer module 16 also includes an input buffer 70, an output buffer 72, logical multiplexers 76, a receive bus 78, a transmit bus 80, and a link interface 82.

The link receive engine 60 is configured for managing link layer operations associated with receiving data packets, and the link send engine 62 is configured for managing link layer operations associated with transmitting data packets, according to the InfiniBand™ specification. The link send engine 62 also includes a virtual lane arbitration module 64 configured for performing virtual lane arbitration, for example weighted round robin arbitration. In particular, virtual lanes, defined in the InfiniBand™ Architecture Specification, enable multiple logical flows to be implemented over a single physical link, where link level flow control can be applied to one virtual lane without affecting other virtual lanes.

The link complete engine 68 is configured for preparing packets for transmission, for example by constructing a local routing header (LRH), calculating a cyclic redundancy check (CRC) value for the packet, and appending the LRH and CRC fields to the packets.

The VL arbitration module 64 is implemented as a state machine with registers, and is configured for managing the VL arbitration table (not shown) supplied by the host process 22, for servicing of the virtual lanes. The VL arbitration module 64 also determines which virtual lane to service, in what order, and for what duration (e.g., based on bandwidth considerations, internal buffer capacity, flow control credits or combination thereof). The establishment and tear down of virtual lanes is managed by the link complete engine 68.

The link layer module 16 outputs the transmit packets according to a credit-based flow control managed by the flow control module 66. In particular, the flow control module 66 monitors the available credits for transmission of a transmit packet on the assigned virtual lane. In particular, credits are sent on a per virtual lane basis, where a receiver issues a credit based on packets taken from an incoming virtual lane buffer; the credits are sent to the sender, enabling the sender to manage flow control. Hence, if the flow control module 66 determines that an identified virtual lane has an insufficient number of credits, the flow control module 66 sends an instruction to the link send engine 62 to defer transmission on the corresponding virtual lane until a sufficient number of credits have been received.

The output buffer 72 and the input buffer 70 each are implemented, for example, as random access buffers that mimic FIFO buffers within memory portions 74 based on respective write pointers 56 controlled by the transport layer module 56, read pointers 84 controlled by the link layer module 16, and virtual lane-packet counters 58 that are incremented by the transport layer module 14 and decremented by the link layer module 16.

The output buffer 72 in the link layer module 16 is configured for buffering transmit data, including payload data retrieved from the outbound memory buffer 54b, following link layer processing by the link send engine 62. The outbound memory buffer 54b includes multiple internal buffers 74 assigned to the respective virtual lanes, described below with respect to FIG. 4.

The multiplexers 76, controlled by the link send engine 62, are used to select a link width of the port. In particular, the multiplexers 76 are used to enable selection of 1×, 4×, and 12× link widths according to the InfiniBand™ Specification.

Figure 4:
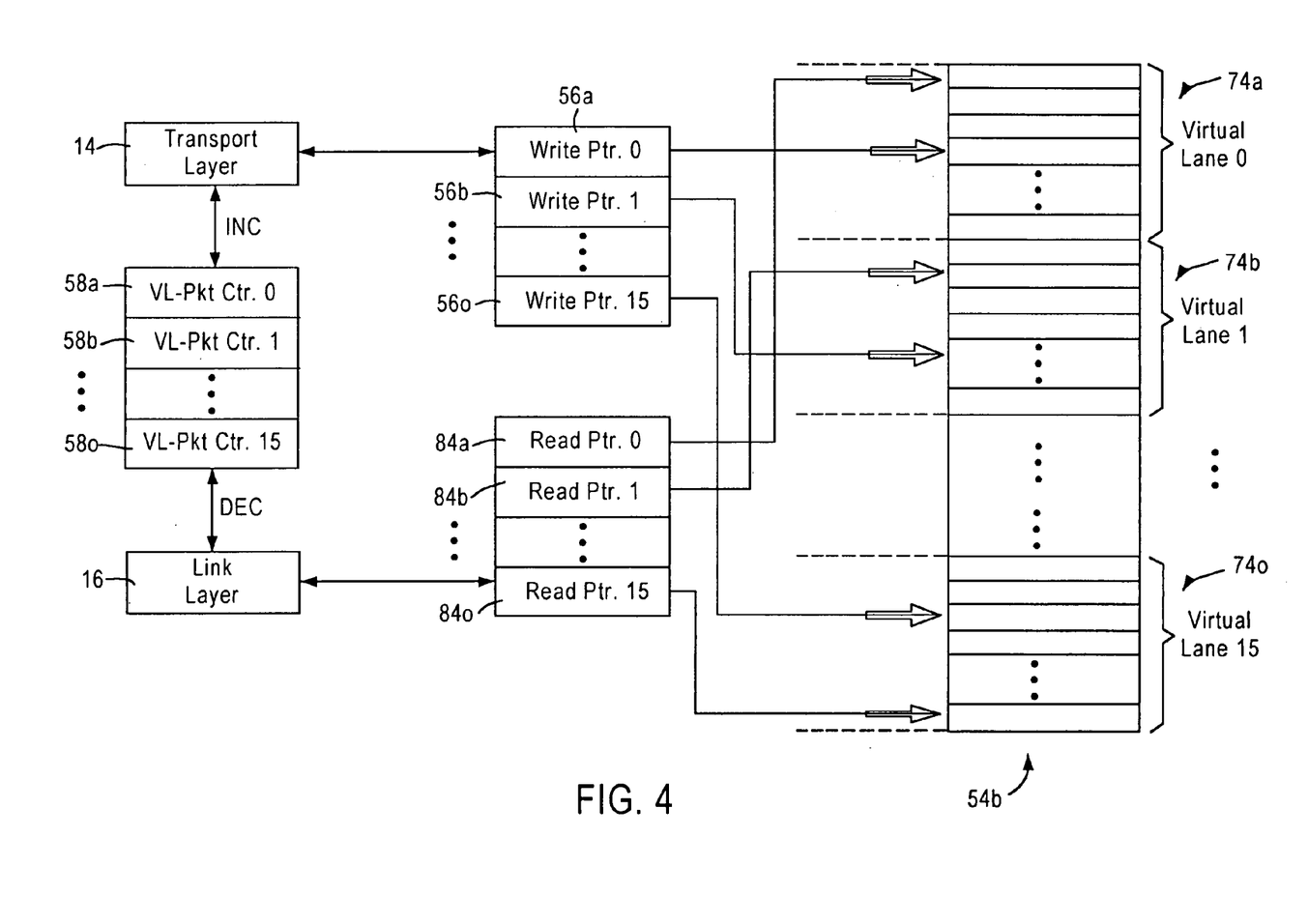
FIG. 4 is a diagram illustrating in detail the memory portions of the outbound memory buffer and the read and write pointers of FIGS. 2 and 3, according to an embodiment of the present invention.

FIG. 4 is a diagram illustrating in further detail the write and read pointers used by the transport layer module 14 and the link layer module 16 for writing and reading transmit data packets between the memory regions (i.e., memory portions) 74, respectively. Each virtual lane processed by the link layer module 16 has an associated write pointer 56, memory region 74, read pointer 84, and virtual lane packet counter 58. For example, the transport layer 14 writes a transmit data packet assigned to virtual lane "1" (VL1) into the memory portion 74b at a location specified by the write pointer 56b, updates the write pointer 56b to a new memory location based on the size of the transmit data packet, and increments the corresponding virtual lane packet counter 58b to indicate another transmit data packet added to the corresponding memory portion 74b.

The link send engine 62 fetches the stored transmit data packets for the currently-serviced virtual lane (e.g., VL0) by reading the stored transmit data packets from the memory portion 74a at a read address specified by the read pointer 84a corresponding to the currently-serviced virtual lane; the link send engine 62 in the link layer 16 updates the read address specified by the read pointer 84a, and decrements the corresponding virtual lane packet counter 58a.

Figure 5:
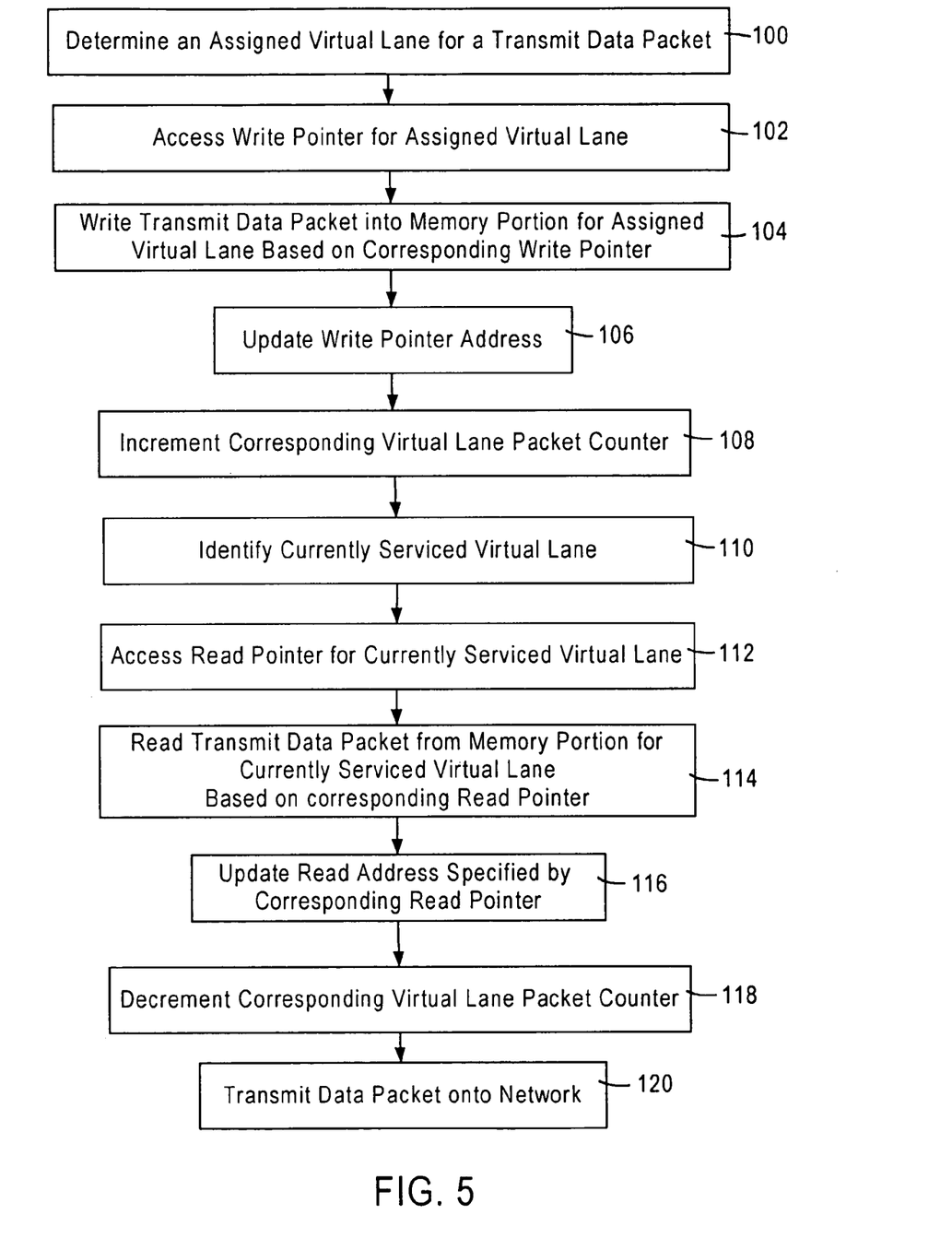
FIG. 5 is a diagram illustrating the method of segregating packets based on virtual lanes, according to an embodiment of the present invention.

FIG. 5 is a flow diagram illustrating the method of segregated packets based on virtual lanes, according to an embodiment of the present invention. The method begins in step 100, where the channels manager 40 determines an assigned virtual lane (e.g., VL15) for a transmit data packet.

The transmit module 50, upon determining the assigned virtual lane, accesses in step 102 the corresponding write pointer 56 (e.g., 56o for VL15) to determine the write address for the transmit data packet within the corresponding memory portion 74o, and writes in step 104 the transmit data packet at the write address specified by the write pointer 56o and concurrently updates in step 106 the write address specified by the write pointer 56o as the transmit data packet is written in the corresponding memory portion 74o. After transmit data packet is written into the memory portion 74o based on the corresponding determined virtual lane, the transmit module 50 increments in step 108 the corresponding virtual lane packet counter 58o to reflect the number of transmit data packets stored in the corresponding memory portion 74o.

The link send engine 62, operating independently of the transport layer 14, identifies in step 110 the currently-serviced virtual lane (e.g., VL0) based on a prescribed virtual lane arbitration, for example a weighted round robin arbitration. The link send engine 62 begins servicing the currently-serviced virtual lane (e.g., VL0) by accessing in step 112 the read pointer 84a corresponding to the currently-serviced virtual lane, and reading in step 114 at least one stored transmit data packet from the memory portion 74a corresponding to the currently-serviced virtual lane VL0 at the read address specified by the corresponding read pointer 84a. The link send engine 62 updates in step 116 the read address specified by the corresponding read pointer 84a as the transmit data packet is read from the memory portion 74a, and decrements in step 118 the corresponding virtual lane packet counter 58a as the transmit data packet is read from the memory portion 74a. The link send engine 62 then transmits in step 120 the transmit data packet according to InfiniBand™ protocol.

According to the disclosed embodiment, transmit data is segregated in buffers based on virtual lanes, enabling the transport layer and the link layer to operate independently, where the transport layer can store transmit packets in the order in which work notifications are received, and the link layer can read the transmit packets for transmission based on virtual lane prioritization.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:
   determining by a transport layer module in the host channel adapter an assigned virtual lane for a transmit data packet generated by the transport layer module for transmission of the transmit data packet by the host channel adapter onto a network;
   storing, by the transport layer module, the transmit data packet into a selected memory portion associated with the assigned virtual lane of a buffer memory, the buffer memory having multiple memory portions for storing transmit data packets according to respective assigned virtual lanes;
   identifying by a link layer module in the host channel adapter a currently-serviced virtual lane based on a prescribed virtual lane arbitration; and
   fetching, by the link layer module, stored transmit data packets from an identified one of the memory portions based on the corresponding currently-serviced virtual lane, for transmission of the fetched stored transmit data packets onto the network.

2. The method of claim 1, wherein the storing step includes:
   writing the transmit data packet at a write address specified by a write pointer for the selected memory portion; and
   updating the write address specified by the write pointer for the selected memory portion based on the writing step.

3. The method of claim 2, wherein the fetching step includes:
   reading the stored transmit data packets from a read address specified by a read pointer for the identified one memory portion; and
   updating the read address specified by the read pointer for the identified memory portion based on the reading step.

4. The method of claim 3, wherein the storing step further comprises incrementing a virtual lane packet counter for the selected memory portion for each transmit data packet written into the corresponding selected memory portion, the host channel adapter including a plurality of virtual lane packet counters for the memory portions, respectively.

5. The method of claim 4, wherein the fetching step includes decrementing the virtual lane packet counter for the identified memory portion for each stored transmit data packet retrieved from the corresponding identified one memory portion.

6. A host channel adapter comprising:
   a buffer memory having memory portions for storage of transmit data packets assigned for transmission on respective virtual lanes;
   a transport layer module configured for generating each transmit data packet and determining a virtual lane for each transmit data packet, the transport layer module configured for storing each transmit data packet into a corresponding selected memory portion based on the corresponding determined virtual lane; and
   a link layer module configured for identifying a currently-serviced virtual lane based on a prescribed virtual lane arbitration, the link layer module configured for fetching the stored transmit data packets from an identified one of the memory portions based on the corresponding currently-serviced virtual lane, for transmission of the fetched stored transmit data packets onto a network.

7. The channel adapter of claim 6, further comprising a plurality of write pointers for the memory portions, respectively, the transport layer module configured for writing said each transmit data packet into the corresponding selected memory portion for the corresponding determined virtual lane at a write address specified by the corresponding write pointer, the transport layer module configured for updating the write address specified by the corresponding write pointer based on writing said each transmit data packet.

8. The channel adapter of claim 7, further comprising a plurality of read pointers for the memory portions, respectively, the link layer module configured for reading the stored transmit data packets from the identified one of the memory portions based on a read address specified by the corresponding read pointer, the link layer module configured for updating the read pointer address specified by the corresponding read pointer for each transmit data packet read from the corresponding identified one memory portion.

9. The channel adapter of claim 8, further comprising a plurality of virtual lane packet counters for counting the stored transmit data packets in the respective memory portions, the transport layer module configured for incrementing one of the virtual lane packet counters in response to writing a transmit data packet into the corresponding memory portion.

10. The channel adapter of claim 6, wherein the link layer module is configured for decrementing the one virtual lane packet counter in response to reading a stored transmit data packet from the corresponding memory portion.

* * * * *